United States Patent [19]

Moehlman et al.

[11] Patent Number: 5,085,482
[45] Date of Patent: Feb. 4, 1992

[54] SEAT BACK MOUNT

[75] Inventors: Philip M. Moehlman, Farmington Hills; Syed A. Shahab, Bloomfield Hills, both of Mich.

[73] Assignee: Ford Motor Company, Dearborn, Mich.

[21] Appl. No.: 582,466

[22] Filed: Sep. 13, 1990

[51] Int. Cl.⁵ ............................................. B60N 2/00
[52] U.S. Cl. ........................................ 296/63; 297/444
[58] Field of Search .................... 296/63, 65.1, 69; 297/231, 283, 443, 444, 379; 24/295, 615, 616; 292/19; 403/405.1, 406.1; 248/224.4, 225.2

[56] References Cited

U.S. PATENT DOCUMENTS

| 1,589,460 | 6/1926 | Cosgrove . | |
|---|---|---|---|
| 2,602,691 | 7/1952 | Doty . | |
| 2,750,227 | 6/1956 | Orr . | |
| 3,051,952 | 8/1962 | Pifer | 24/616 |
| 3,410,600 | 11/1968 | Thorpe . | |
| 3,727,976 | 4/1973 | Lystad | 297/379 |
| 3,881,676 | 5/1975 | Reinwall | 248/224.4 |
| 4,068,890 | 1/1978 | Kurozu et al. | 297/379 |
| 4,105,245 | 8/1978 | Simons et al. | 280/65 R |
| 4,191,417 | 3/1980 | Ferrara | 296/65.1 |
| 4,475,763 | 10/1984 | Hamatani et al. | 296/65.1 |
| 4,572,569 | 2/1986 | HaBmann | 296/65.1 |
| 4,609,221 | 9/1986 | Böttcher | 296/65.1 |
| 4,745,667 | 5/1988 | Conte | 24/615 |
| 4,971,380 | 11/1990 | Cote et al. | 296/63 |

FOREIGN PATENT DOCUMENTS 1036491 9/1953 France ................................. 24/295

Primary Examiner—Margaret A. Focarino
Assistant Examiner—Joseph D. Pape
Attorney, Agent, or Firm—Daniel M. Stock; Roger L. May

[57] ABSTRACT

A mounting assembly for rear seat backs of automobiles is provided which permits the horizontal positioning of a seat back with respect to a vertical body panel to effect snap fit insertion of a plurality of clips carried on the rear of the seat back frame into apertures formed through the vertical body panel.

5 Claims, 2 Drawing Sheets

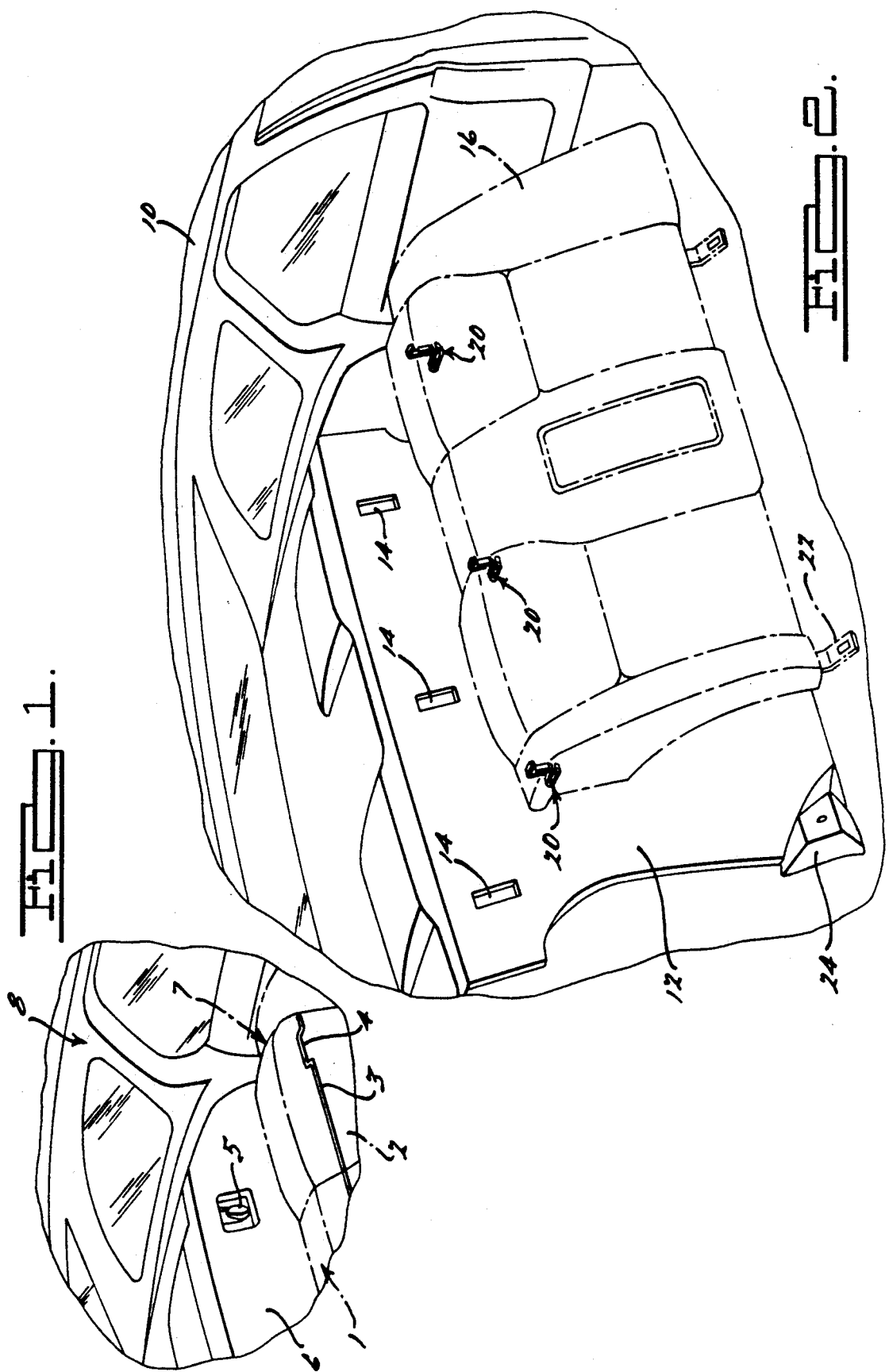

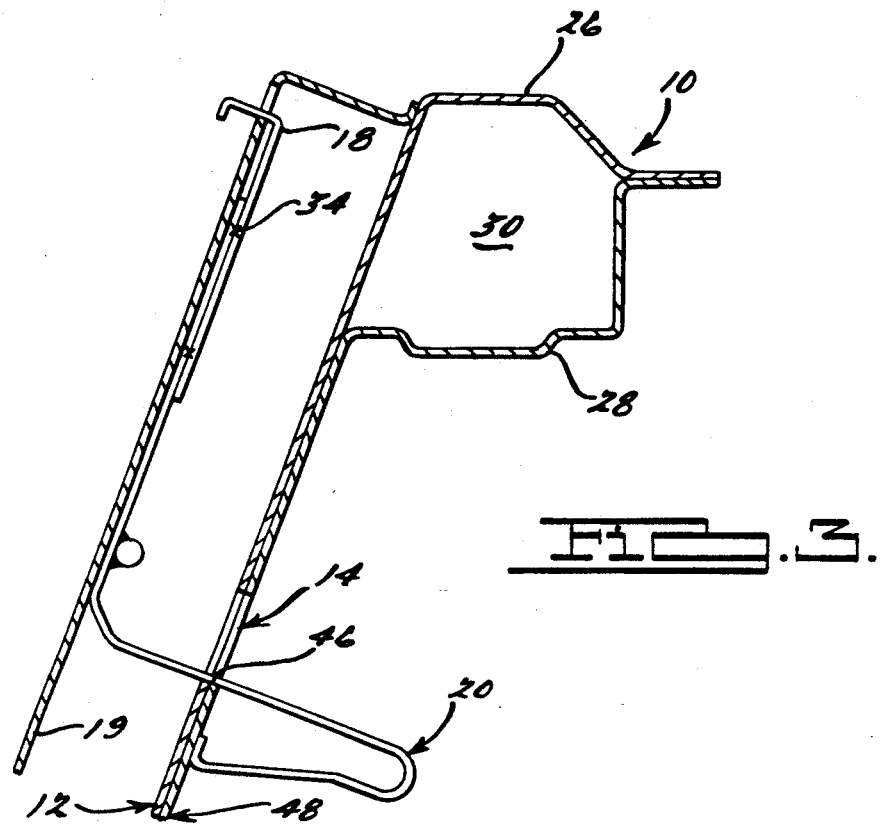
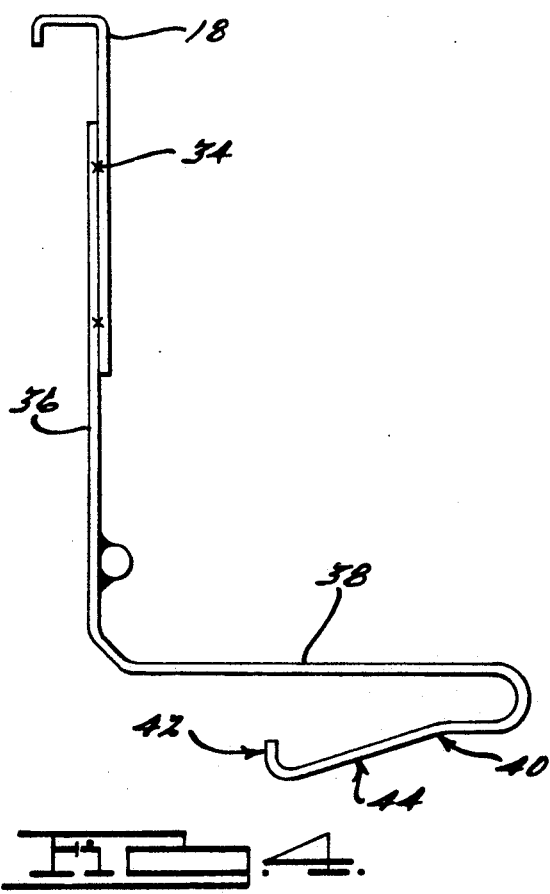
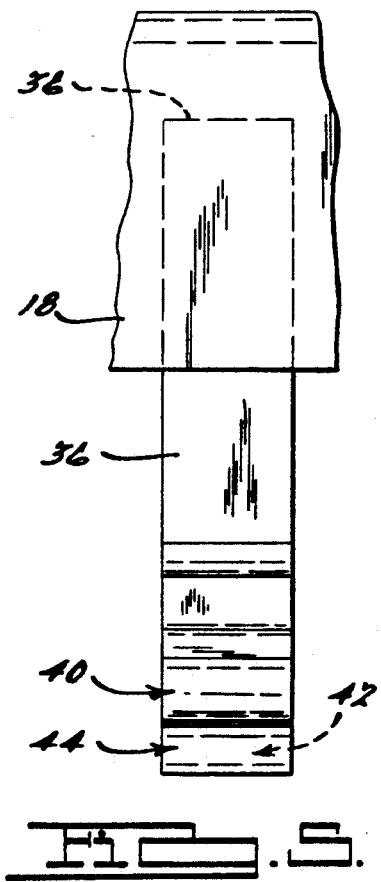

SEAT BACK MOUNT

BACKGROUND OF THE INVENTION

A conventional process for mounting the rear seat back in an automotive vehicle to the vehicle body structure consists of suspending the seat back adjacent its upper edge from a hook structure and fixedly securing the bottom of the seat back to structure fixed to the vehicle floor. This is generally accomplished by providing a wire or rod extending laterally across the seat back for engagement in an upward opening hook structure fixed to a generally vertical body panel against which the seat back is to be positioned.

Disadvantages have been noted in employing this seat back mounting process in certain vehicles. One results from the fact that modern styling trends often call for an inward curvature of the pillar structure defining the passenger compartment of the vehicle at positions adjacent the rear seat. Since suspending the seat on the upstanding hook structure necessitates lifting the entire seat above the hook and dropping it down into engagement, rubbing interference with the outboard corners of the seat back against the interior surfaces of the vehicle can hinder installation.

A second disadvantage arises from the lack of dimensional tolerance compensation inherent with attempting to mount the seat through engagement with two widely separated surfaces, such as the upper hook and the lower securement.

SUMMARY OF THE INVENTION

Responsive to these disadvantages, it is an object of the present invention to provide a mounting assembly for a rear seat back which permits assembly into the vehicle body without substantially raising the seat back above its final assembled position.

It is another object of the present invention to provide a mounting assembly for a rear seat back that provides a resilient tolerance compensating attachment structure.

These objects are achieved through provision of a mounting assembly that provides a plurality of clip members secured to the frame of the seat back which are engageable in snap-fit relationship with a corresponding plurality of vertically elongated aperture formed in the body panel against which the seat is assembled.

BRIEF DESCRIPTION OF THE DRAWINGS

These and other objects will become apparent skilled in the vehicle seating arts upon reading the following description with reference to the accompanying drawings in which:

FIG. 1 is a depiction in perspective view of a prior art mounting assembly for rear seat backs;

FIG. 2 is an enlarged perspective view of the mounting assembly of the present invention;

FIG. 3 is a cross-sectional view of the mounting assembly of the present invention in the installed position;

FIG. 4 is a side view of the clip of the invention mounting assembly in its assembled position; and FIG. 5 is an end view of the clip of FIG. 4.

DESCRIPTION THE PREFERRED EMBODIMENT

Turning now to the drawings and in particular to FIG. 1 thereof, a prior art mounting assembly 1 is illustrated. In this mounting assembly, a vehicle seat back 2 includes a laterally extending wire 3 having a loop 4 for engagement over an upstanding hook structure 5 carried on a generally vertical surface 6 of the vehicle body. As can be seen in FIG. 1, engaging the loop 4 with the hook 5 necessitates lifting the seat back 2 above its final assembled position. For some vehicle configurations, this can result in an interference with the outboard corner 7 of the seat back 2 with inward sloping interior surfaces 8 of the vehicle body.

According to the present invention, as can be seen in FIG. 2, this lifting assembly sequence is not required. In the preferred embodiment, the vehicle body 10 includes a generally vertically extending panel 12 through which there is formed a plurality of elongated rectangular apertures 14. A rear seat back 16 has a rearward facing frame 18, an upper laterally extending portion of which can be seen in FIG. 3. The frame 18 is secured to seat cushioning material, the rear surface of which is indicated at 19 by conventional means. In some embodiments, the frame may be surrounded by foam molded in situ. The frame 18 has mounted thereon a plurality of clip members 20 fixedly secured to the seat frame 18 and projecting rearwardly therefrom so that horizontal movement of the seat back 16 effects insertion of the clips 20 into the apertures 14 when the clips 20 are spaced on the seat back 18 to allow registration with the apertures 14. Final assembly of the seat back 16 against the panel 12 is effected by engagement of apertured tabs 22 of the seat frame 18 abutingly engaging upstanding mounting bosses 24 in the vehicle body 10 adjacent the panel 14. Suitable fasteners (not shown) extend through the apertured tabs 22 to engage in the bosses 24 and fixedly secure the seat back 16.

Turning now to FIGS. 3 to 5, a preferred embodiment for the clips 20 and the adjacent structure of the body 10 illustrate the efficacy of the assembly previously described. The portion of the body 10 adjacent the position in which the seat 16 is assembled is preferably formed as a sheet metal stamping and includes an outer panel 26 and an inner panel 28 fixedly secured together as by weldments (not shown). The profile of the inner panel 28 and outer panel 26 is preferably configured to form a box beam 30 extending laterally across the vehicle. On the forward face 32, the generally vertically extending panel 12 is situated, the panel 12 being pierced by the apertures 14. Arranged in juxtaposition with the apertures 14 in the embodiment shown are suitable mounting structures for the clips 20. In the embodiment illustrated in FIG. 3, that mounting weldments 34 (one shown) attaching a portion of the clip 20. It will be understood, however, that other mechanisms, including threaded fasteners, adhesives and other conventional attachment mechanisms, may be used to fixedly secure the clips 20 to the slat frame 12.

The clip 20 is formed as a generally L-shaped stamping, preferably of a relatively thin gauged metal, to effect resilience, and includes essentially a flat mounting Plate portion 36, a flat Positioning arm portion 38 having a lateral width with respect to the vehicle approximately equal to the width of the apertures 14 extending perpendicularly from the mounting arm portion 34 and a turned back clip portion 40 resiliently suspended from the end of the positioning arm 38 distal the mounting plate 36. The clip portion 40 preferably has a relaxed vertical dimension slightly greater than the vertical length of the slots 14. A curved abutment surface 42 is formed on the free end of the clip portion 40.

It can be readily seen that when the clips 20 are fixedly secured on the seat frame 18, the positioning arm 38 is presented in a perpendicularly extending fashion toward the apertures 14. As the seat back 16 is moved in a generally horizontal direction normal to the surface of the panel 12, the angled ramp surface 44 of the clip portion 40 may engage the lower edge 46 of the apertures 14 flexing the clip portion 40 toward the positioning arm 38 until the abutting surface 42 clears the inner face 48 of inner panel 28, at which time the clip portion 48 will spring outwardly to engage behind the panel 12, as shown in FIG. 3. At this point the seat 16 is pushed down to the position shown. It then resists movement of the seat back 16 away from the panel 12.

While only one embodiment of the invention mounting assembly is here disclosed, others may be possible without departing from the scope of the appended claims.

We claim:

1. A mounting assembly for the rear seat back of a vehicle, the seat having a rearwardly facing substantially rigid frame portion and the vehicle having a body panel defining a substantially vertical plane for receiving a seat frame portion in confronting relationship, the mounting assembly comprising:

means defining a plurality of vertically elongated apertures in said body panel; and a plurality of clip members fixedly secured to said seat frame and engageable in snap-fit relationship with said body panel through said apertures in response to movement of said seat back in a substantially horizontal direction toward said body panel.

2. A mounting assembly as defined in claim 1, wherein each of said clip members comprises a generally L-shaped member having:

a flat mounting plate;

means fixedly securing said mounting plate to said seat back;

a flat positioning arm extending perpendicularly from one end of said mounting plate; and a turned back clip portion extending toward said mounting plate and resiliently suspended from said positioning arm and having an angled ramp surface engageable with an edge of said aperture to deflect toward said positioning arm to effect said snap-fit engagement.

3. A mounting assembly as defined in claim 2, and further comprising a flat abutment portion substantially parallel the said mounting plate extending from the free end of said clip portion, said abutment portion being engageable with a portion of said body panel upon engagement of said clip members with said body panel to prevent relative movement therebetween.

4. A mounting assembly as defined in claim 2 wherein said apertures are rectangular and said positioning arm has a width lateral of the vehicle substantially equal to that of the apertures to resist lateral movement therebetween.

5. A mounting assembly as defined in claim 1, wherein said clip comprises a stamping formed of thin gauged metal.

* * * * *